United States Patent [19]

Stinnett

[11] Patent Number: 4,601,619

[45] Date of Patent: Jul. 22, 1986

[54] ROUTING APPARATUS

[76] Inventor: John L. Stinnett, 6401 W. Washington, Phoenix, Ariz. 85043

[21] Appl. No.: 664,695

[22] Filed: Oct. 25, 1984

[51] Int. Cl.⁴ .............................................. B23C 1/06
[52] U.S. Cl. ..................................... 409/180; 409/178
[58] Field of Search .............. 409/180, 178, 175, 179, 409/130, 184; 144/134 A, 134 D, 136 R, 136 C

[56] References Cited

U.S. PATENT DOCUMENTS

| | | | |
|---|---|---|---|
| 2,596,868 | 5/1952 | Richards, Jr. | 409/175 |
| 3,114,292 | 12/1963 | Harris et al. | 409/178 X |
| 3,479,922 | 11/1969 | Shuey | 409/182 |
| 3,501,999 | 3/1970 | Parks | 409/178 X |
| 3,541,922 | 11/1970 | Laur | 409/178 X |
| 3,587,391 | 6/1971 | Pitts | 409/180 |
| 3,853,160 | 12/1974 | Posey | 409/180 X |
| 4,251,174 | 2/1981 | Satler | 409/178 X |

FOREIGN PATENT DOCUMENTS

| | | | |
|---|---|---|---|
| 15483 | 6/1956 | Fed. Rep. of Germany | 409/175 |
| 2461537 | 7/1976 | Fed. Rep. of Germany | 409/178 |

Primary Examiner—William R. Briggs
Attorney, Agent, or Firm—Drummond & Nissle

[57] ABSTRACT

Improved apparatus for routing a groove in the surface of a panel of material. The apparatus includes a base, a first elongate horizontally oriented support arm having one end pivotally attached to the base and having another end pivotally attached to one end of a second elongate horizontally oriented support arm. A milling head is mounted on the other end of the second elongate support arm. The pivotally interconnected support arm pair permit the milling head to be laterally displaced in an infinite number of directions. The application of an upward or downward force on the milling head causes resilient flexure of the support arm pair, the flexure permitting the upward or downward displacement of the milling head and of a tool bit rotatably carried in the milling head. The apparatus utilizes the resilient flexure of the horizontally disposed support arm pair to insure that a groove of constant depth is routed in the surface of a panel of material.

3 Claims, 8 Drawing Figures

ROUTING APPARATUS

This invention relates to apparatus for milling a panel of material.

More particularly, the invention relates to routing apparatus of the general type including a base, a first elongate horizontally oriented support arm having one end pivotally attached to the base and having another end pivotally attached to one end of a second elongate horizontally oriented support arm, the other free end of the second elongate support arm having a milling head mounted thereon, the pivotally interconnected support arm pair permitting the milling head to be laterally displaced to an infinite number of positions.

In another respect, the invention relates to routing apparatus of the general type described in which the application of an upward or a downward force on the milling head causes resilient flexure of the support arm pair, the flexure permitting the upward or downward displacement of the milling head and of a tool bit rotatably carried in the milling head.

In a further respect, the invention relates to milling apparatus of the general type described which can be utilized in combination with a template to rout grooves of generally constant depth in a stationary piece of panel material.

In still another respect, the invention relates to routing apparatus of the general type described which utilizes resilient flexure of the pivotally interconnected milling head support arm pair to insure that a groove of constant depth is routed in a panel of material.

In yet a further respect, the invention relates to milling apparatus of the general type described which generates an upward force on the milling head to cause the resilient flexure of said interconnected support arm pair.

Apparatus for milling openings through doors and other panel shaped objects is well known in the art. The Norfield Model 3800 FL milling machine is, for example, specially designed to bore openings through metal and wood doors. The Model 3800 FL is produced by Norfield Manufacturing Company of P. O. Drawer 688, Chico, Calif. 95927, and includes a table for fixedly supporting a door blank and a template clamped in position on top of the door blank. Apertures are formed through the template. Each aperture is defined by a peripheral template edge extending around the aperture. The milling head of the Model 3800 FL is attached to the forward free end of an elongate horizontally disposed support arm. The rear end of the support arm is pivotally attached to one end of a second elongate horizontally disposed support arm. The other end of the second support arm is pivotally attached to a base. The operatively associated pivotally interconnected support arm pair permits the milling head to be laterally displaced in an infinite number of directions so that a rotary tool bit carried by the milling head can cut openings of any shape through a door blank. The milling head is moved by grasping a pair of handles connected to the milling head and laterally pushing or pulling the milling head. The tool bit extends downwardly from a cylindrical surface which extends downwardly from the bottom of the milling head. The cylindrical surface bears against and travels along the peripheral edge of an aperture in the template when an opening is being cut through a door panel with the tool bit. The longitudinal axis of the tool bit generally corresponds to and lies along the vertical imaginary centerline of the cylindrical surface.

Although the elongate horizontally disposed arms supporting the milling head are substantially rigid, resilient flexure of the arms occurs when upward or downward forces are applied to the milling head. During operation of the apparatus a downward force is often applied to the milling head when an individual grasps the handles on either side of the head and laterally displaces the head. This downward force causes resilient flexure of the support arm pair which results in the concomitant downward displacement of the milling head and tool bit carried by the head. The length of the cutting blade(s) of the tool bit is greater than the thickness of the door blank and portions of the blade extend well above and below the door blank when the tool bit is cutting an opening through the blank. Consequently, downward displacement of the bit resulting from resilient flexure of the support arm pair is of no moment because the bit blade is long enough to compensate for such downward (or upward) displacement of the milling head.

The Norfield Model 3800 FL cannot be utilized to rout grooves in a door because resilient flexure of the support arm pair causes the grooves to be of uneven depth. Doors are often fabricated from laminae of differing color and texture. It is critical that grooves routed in a door be of uniform depth because slight alterations in the depth of a groove cut in a laminate door can expose laminae having a color or texture different from that of laminae visible along other portions of the groove.

Another reason the Norfield Model 3800 FL and similar apparatus are not utilized to rout grooves in a door blank is that fixedly positioning a door blank on a stationary work table so that the upper planar surface of the door is perfectly level is impractical. When a door is positioned on a work table, one area of the upper planar surface of the door will usually be higher or lower than an adjoining surface area. Thus, even if resilient flexure of the support arm pair did not occur and the vertical height of the milling head and tool bit remained constant during utilization of the apparatus to rout a groove, the depth of a groove cut by the tool bit would vary as the bit moved from a low door surface area to a high door surface area.

A variety of commercially available machines are specifically constructed to rout grooves in a panel of material. Examples of commercially available router machines are the ACCU-ROUTER, SERIES I, built by Powermatic Division of Houdaille Industries, Inc., McMinnville, Tenn. 37110 and the CARTESIAN 5, Model 20 manufactured by Thermwood Corporation of 1910 Firman, Suite 110, Richardson, Tex. 75081. Such machines adjustably mount a rotary tool bit on a massive support structure which is very rigid and generally not susceptible to resilient flexure. The machines cost in excess of $35,000. In contrast, the Norfield Model 3800 FL costs approximately $14,000.

Accordingly, it would be highly desirable to provide improved routing apparatus which included a milling head mounted on an elongate support arm pair susceptible to resilient flexure when upward and downward forces are applied to the milling head and which could be utilized to rout grooves of constant depth in the upper planar surface of a door blank when the blank is fixedly supported on a work table such that the upper planar surface of the blank is not level.

Therefor, it is a principal object of the invention to provide improved routing apparatus.

A further object of the invention is to provide improved routing apparatus of the type including a milling head mounted at one end of an elongate horizontally oriented arm which is susceptible to resilient flexure when a downward or upward force is applied to the milling head.

Another object of the invention is to provide routing apparatus of the type described which utilizes the inherent resilient flexure of the horizontally disposed support arm to insure that a groove of constant depth is cut in the planar upper surface of a panel of material when the panel is not perfectly level.

Still a further object of the instant invention is to provide milling apparatus of comparatively low cost which can be utilized both to mill openings through a panel of material and to rout grooves of constant depth in the surface of the material.

These and other, further and more specific objects and advantages of the invention will be apparent to those skilled in the art from the following detailed description thereof, taken in conjunction with the invention drawings, in which.

Figure 1:
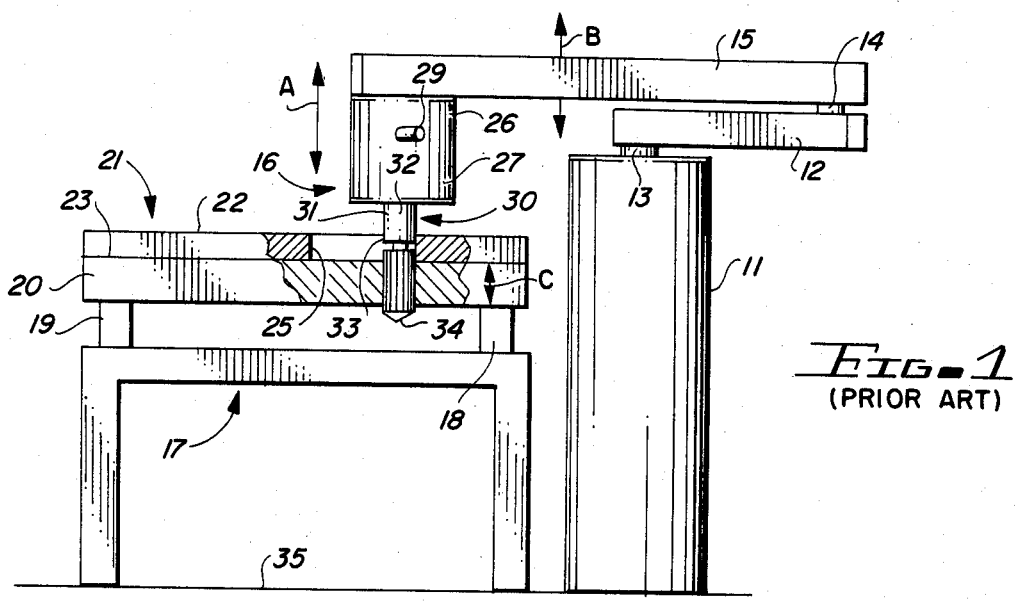
FIG. 1 is a side view of prior art milling apparatus utilized in conjunction with a template to bore openings through a panel of work material.

Briefly, in accordance with my invention, I provide improved apparatus for routing elongate grooves in a panel of material, said panel including an upper planar surface. The improved routing apparatus includes a table for supporting in generally horizontal fixed position the panel of material and a template positioned on top of the panel of material, the template having top and bottom surfaces each lying in a generally horizontally disposed imaginary plane and having at least one opening formed therethrough, the opening including a peripheral edge defining the opening; a base; a first generally horizontally oriented elongate support arm having a first end and a second end, the first end being pivotally connected to the base such that the support arm pivots in a generally horizontal plane; a second generally horizontally oriented elongate support arm having a rear end pivotally attached to the second end of the first support arm such that the second support arm pivots in a generally horizontal plane and having a forward end carrying a milling head having a top portion and a bottom portion. The milling head also includes a cylindrical member extending downwardly from the bottom portion of the milling head and having an upper end and a lower end and an outer surface circumscribing a generally vertical imaginary axis, the outer surface being forced against and tracking the peripheral edge of the template opening when the apparatus is utilized to rout a groove in the panel of material; a cylindrical drill bit extending downwardly from the lower end of the cylindrical member, the bit having a longitudinal axis generally corresponding to and lying along the generally vertical imaginary axis; means for rotating the drill bit; a fixed surface generally lying in an imaginary horizontal plane perpendicular to the imaginary vertical axis, the fixed surface circumscribing and extending outwardly from the upper end of the cylindrical member and being provided with template contacting means extending downwardly therefrom, the template contacting means moving over the top surface of the template with minimal frictional resistance when forced against and moved laterally across the top surface of the template when the apparatus is utilized to rout a groove in the upper planar surface of the panel of material; and, handles which can be grasped and pulled and pushed to laterally displace the milling head and first and second elongate support members in an infinite number of directions. The mill head has at least three operative elevations, a first normal operative elevation with the template contacting means of the fixed surface contacting the top surface of the template without an upward displacement force being generated on the fixed surface and the milling head; a second operative elevation with the template contacting means of the fixed surface contacting the top surface of the template such that the template generates an upward force on the milling head causing resilient flexure of the first support arm and upward displacement of the milling head from the first normal operative elevation to the second operative elevation; and, a third operative elevation with the top surface of the template spaced downwardly away from the template contacting means of the fixed surface such that a downward force exerted on the milling head causes resilient flexure of the first support arm and downwardly displaces the head from the first normal operative elevation to the third operative elevation. The template contacting means, template and panel of material are initially positioned in relation to one another such that the milling head generally only moves between the first and second operative elevations during routing of a groove in the upper planar surface of the panel of material.

Figure 2:
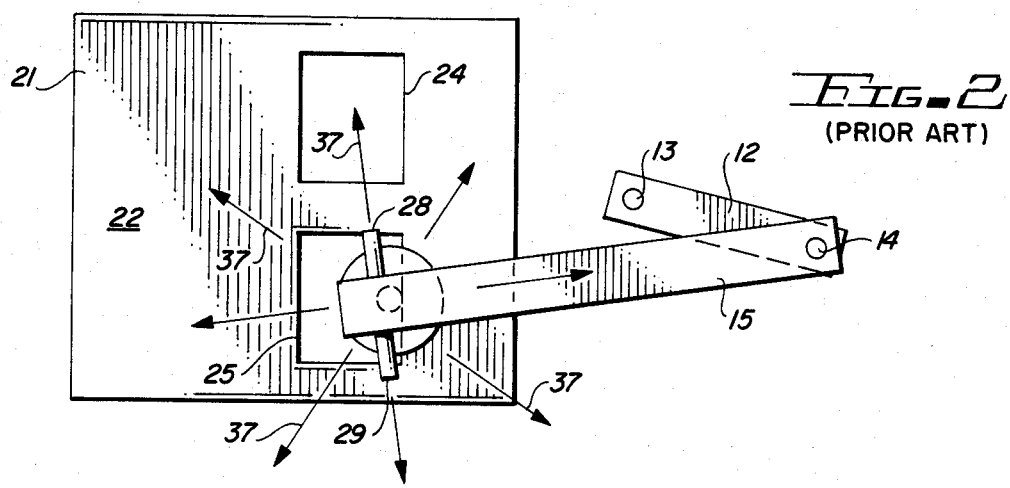
FIG. 2 is a top view of the milling apparatus of FIG. 1.

Turning now to the drawings, which depict the presently preferred embodiments of the invention for the purpose of illustrating the practice thereof and not by way of limitation of the scope of the invention, and in which like reference characters identify corresponding elements through the several views, FIGS. 1 and 2 illustrate a prior art milling machine including base 11, elongate horizontally disposed support arm 12 having one end pivotally attached 13 to base 11 and another end pivotally attached 14 to elongate horizontally disposed support arm 15. The forward end of arm 15 carries milling head 16. Work table 17 includes elongate support blocks 18, 19 supporting panel-shaped workpiece 20 and template 21 positioned on top of workpiece 20. Template 21 includes a generally horizontally disposed upper planar surface 22 and generally horizontally disposed lower planar surface 23 contacting the upper planar surface of workpiece 20. A pair of rectangular apertures are formed through template 21. One aperture has peripheral edge 24 defining the aperture.

Peripheral edge 25 circumscribes and defines the other aperture. Template 21 and work panel 20 are fixedly secured to table 17. Table 17 is provided with leveling means (not shown) which can be used to attempt to position planar surfaces 22, 23 so they are perfectly level.

Milling head 16 includes upper portion 26, lower portion 27 and handles 28, 29 projecting outwardly therefrom. Cylindrical member 30 is connected to and projects downwardly from lower portion 27 of head 16. Member 30 includes cylindrical outer surface 31, upper end 32 and lower end 33. Surface 31 circumscribes an imaginary vertical centerline. Cylindrical tool bit 34 is rotatably secured in member 30. The outer cylindrical surface of bit 34 circumscribes a vertically oriented imaginary centerline coincident with the imaginary vertical centerline of surface 31. Member 30 can be a chuck for rotatably securing bit 34 or can house a chuck. The elevation or vertical distance from floor 35 of member 30 and tool bit 34 can be adjusted utilizing means (not shown) carried in milling head 16. Milling head 16 also includes conventional means (not shown) for rotating bit 34. when the prior art apparatus of FIG. 1 is utilized to bore through panel material 20, cylindrical surface 31 is moved along and bears against a peripheral edge 25 of one of the openings formed in template 22. Bit 34 extends completely through panel material 20.

Pivotally interconnected horizontally disposed support arms 12, 15 permit milling head 16 to be laterally displaced in an infinite number of directions 37 when an individual grasps and pushes and pulls handles 28, 29. Although arms 12, 15 are substantially rigid, their length permits resilient flexure of the arms and milling head 16 as indicated by arrows A and B in FIG. 1 when upward or downward forces are applied to milling head 16. In particular, when an individual grasps handles 28, 29 and pushes and pulls on the handles to laterally displace milling head 16, he usually periodically applies a downward force on the head 16 causing arm 15 to resiliently bend so head 16 is downwardly displaced. Such downward displacement of head 16 is of little importance when an elongate bit 34 is being used to bore an opening completely through panel material 20 because, as illustrated in FIG. 1, the cutting blades of bit 34 extend well above and below the upper and lower horizontally oriented planar surfaces of panel member 20. Since the cutting edges of bit 34 extend well above and below panel material 20, the cutting surface of bit 34 continues to contact the entire height C of panel member 20 even when milling head 16 and bit 34 are partially downwardly displaced during the resilient flexure of arm 15. However, the resilient flexure of arms 12, 15 and concomitant variance in the elevation of bit 34 from floor 35 make it impractical to utilize the apparatus of FIGS. 1 and 2 to rout grooves of constant depth in panel material 20.

The routing apparatus of the invention is illustrated in FIGS. 3 to 8 and includes base 11, horizontally disposed arm 12 pivotally connected 13 to base 11 and pivotally connected 14 to the rear end of elongate horizontally disposed arm 15. Work table 17 supports and is adapted to maintain panel 20 and template 21 in fixed position during routing of grooves in panel 20. Milling head 16 is connected to the forward end of arm 15 and includes upper portion 26, lower portion 27, and handles 28, 29 extending outwardly from milling head 16. Cylindrical member 30 extends downwardly from bottom portion 27 of milling head 16 and includes upper portion 32 and lower portion 33. Router bit 40 is fixedly removably secured in member 30. Member 30 can comprise a chuck or include chuck for receiving and securing the upper end of bit 40. Circular collar member 50 includes cylindrical aperture 51 formed therethrough between circular lower planar surface 52 and upper planar surface 53. Upper surface 53 is shaped and dimensioned to contact the lower horizontal surface 54 of milling head 16 such that when an upward force F is applied to lower surface 52 of member 50, surface 53 is pushed against and supported by surface 54 and surface 52 remains fixed in the generally horizontally oriented position of FIGS. 3 and 6. If desired, surface 53 of collar 50 can be spaced away from lower generally horizontally oriented planar surface 54 of head 16, but collar 50 then needs to be securely fastened to member 30 so that surface 52 remains in fixed horizontal position when upward forces F (FIG. 6) are generated against member 50.

Surface 52 of collar 50 is provided with low friction means for contacting upper surface 22 of template 21. The template contacting means comprises steel ball bearings 55 rotatably carried in spherically shaped apertures 56 formed in bottom surface 52 of collar 55. Aperture 51 is sized to slide over member 30 such that set screw 51 can be tightened against surface 31 to fixedly secure upper surface 53 in position against lower surface 54 of milling head 16.

Figure 6:
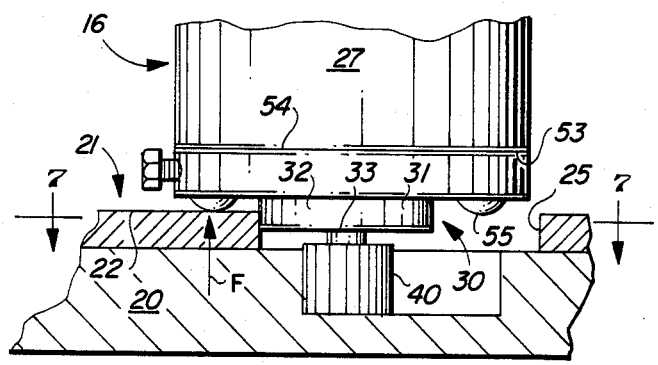
FIG. 6 is an enlarged view of the milling head of the apparatus of FIG. 3 further illustrating the utilization thereof in conjunction with a template to rout grooves in the planar upper surface of a panel of material.

As illustrated in FIG. 6, when the routing apparatus of the invention is utilized, outer surface 31 of cylindrical member 30 moves along and bears against the peripheral edge 25 of a template aperture while the template contacting means 55 of lower surface 52 of collar 50 contacts and readily moves over upper surface 22 of template 21. Surface 52 could be provided with a Teflon ring embedded in surface 52 and circumscribing aperture 51 or could be provided with any other appropriate means which would engage and move over surface 22 with minimal resistance when head 16 was laterally displaced in any of the directions generally indicated by arrows 37 in FIG. 2.

Figure 7:
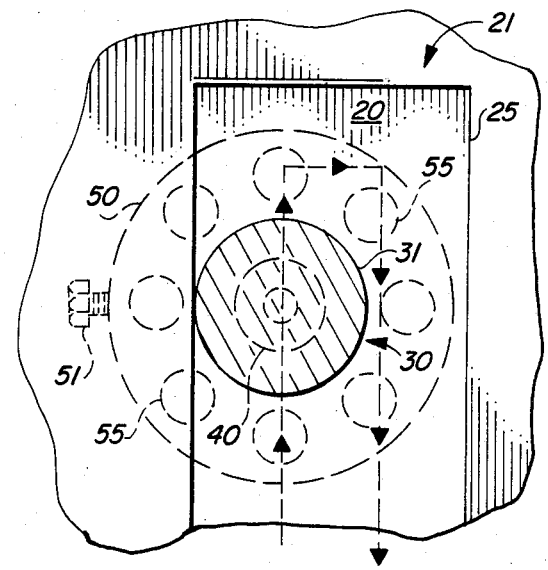
FIG. 7 is a top view of the milling head of FIG. 6.
Figure 8:
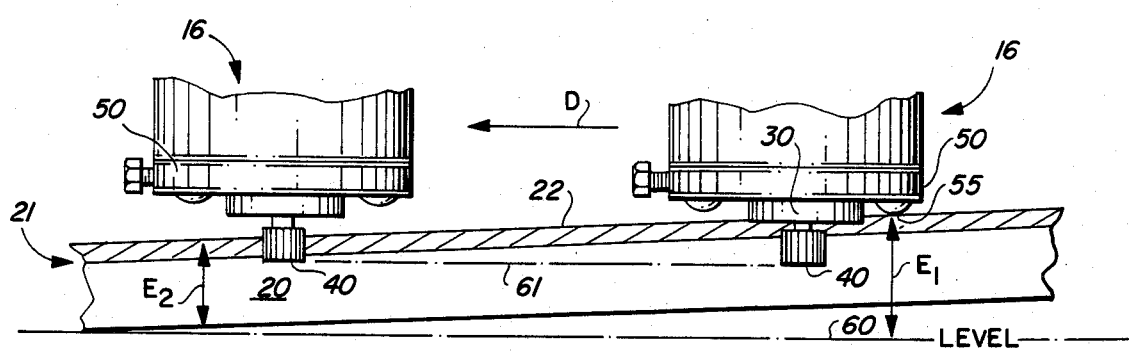
FIG. 8 is a side view of a workpiece and a portion of the milling head of FIG. 6 illustrating the mode of operation of the invention.

Although work table 17 is provided with means for simultaneously leveling the planar surfaces 22, 23 of template 21 and leveling the upper planar surface of panel member 20 contacting template 21, it is, practically speaking, normally not possible to perfectly level template 21 and panel member 20. There are usually points on surface 22 which are of lower elevation, i.e., closer to ground 35, than other points on surface 22. If the apparatus of FIGS. 3 to 7 is initially positioned so that bearings 55 lightly contact surface 22 of template 21 at a high elevation point on surface 22 and is then utilized to rout a groove in panel material 20, the groove will probably be of uneven depth because when head 16 is laterally displaced from the high elevation point on surface 22 to low elevation points on surface 22 the milling head 16 and router bit 40 tend to remain at the same elevation, causing the depth of the groove formed in panel 20 to lessen. This phenomenon is illustrated in exaggerated fashion in FIG. 8, which depicts a milling head 16 which has been initially positioned so that template contacting means 55 touches upper surface 22 of template 21 at an elevation $E_1$ from an imaginary horizontal reference line 60 which is greater than the elevation $E_2$ of a point on another area of surface 22 of template 21. In the initial position of milling head 16 shown in FIG. 8, bearing 55 lightly rests against surface 22 such that there is no upward counteracting force generated by surface 22 against ball bearing 55. In other words, surface 22 does not in any way support the weight of milling head 16. When milling head 16 is moved from its initial position in FIG. 8 to the left in the direction of arrow D to a point where the elevation $E_2$ of surface 22 is less than elevation $E_1$, then the depth of the groove being cut in panel 20 decreases. In FIG. 8 line 61 represents the bottom of the groove cut by bit 40. In order to avoid this problem, it is important the apparatus of the invention be utilized as described below.

Figure 3:
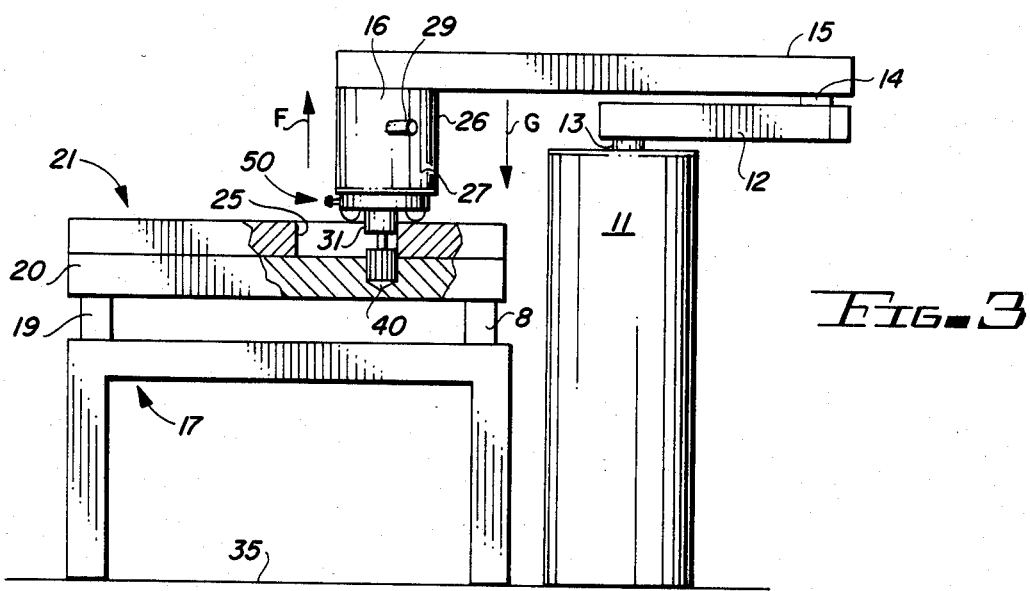
FIG. 3 is a side view of routing apparatus constructed in accordance with the principles of the invention.
Figure 4:
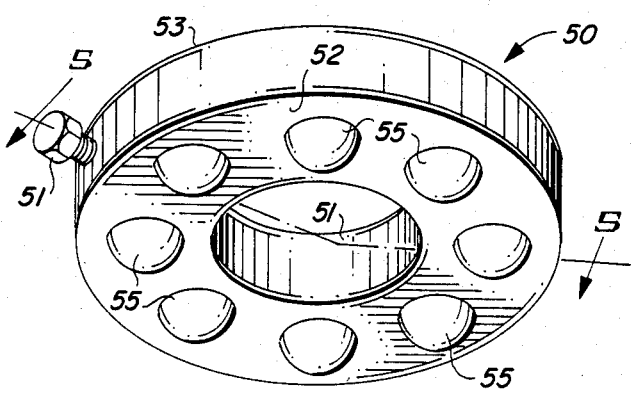
FIG. 4 is a perspective view of one component of the routing apparatus of FIG. 3.
Figure 5:
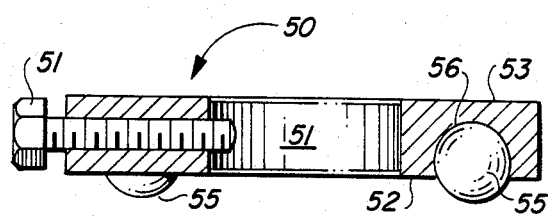
FIG. 5 is a section view of the component of FIG. 4 taken along section line 5–5 thereof and further illustrating interior construction details thereof.

In use, collar member 50 is positioned on cylindrical member 30 as shown in FIGS. 3 and 6 and set screw 50 tightened to maintain member 50 in position on member 30. Panel member 20 and template 21 are fixedly mounted on table 17 and table 17 is adjusted to generally level upper planar surface 22 of template 21. The area of lowest elevation of surface 22 is then determined. This determination can be made utilizing any appropriate conventional method and apparatus. The presently preferred procedure is to move milling head 16 over a first point on template surface 22, remove bit 40, and initially position lower surface 52 or template surface 22 so at least some of bearings 55 contact template surface 22. The elevation of lower surface 52 with respect to surface 22 is adjusted by vertically adjusting the elevation of head 16, of portions of head 16, or, of the top of table 17. Handles 28, 29 are then grasped and head 16 laterally displaced to other points over surface 22. When milling head 16 is moved over a second point on surface 22 having a lower elevation than said first point on surface 22, bearings 55 will be spaced upwardly away from surface 22. If bearings 55 are spaced away from surface 22 when milling head 16 is moved over a new point on surface 22, the elevation of either lower surface 52 or of template surface 22 is adjusted so that bearings 55 contact surface 22. Milling head 16 is then laterally displaced to a position over a new point on surface 22 and, if necessary, the elevation of surface 52 or surface 22 again adjusted so bearings 55 contact surface 22. This procedure is repeated until bearings 55 continue to contact surface 22 when milling head 16 is moved to any position over surface 22.

The apparatus of the invention can be constructed in a variety of ways which permits adjustment of the elevation of horizontally oriented surface 52 or of template surface 22. Milling head 16 can be movably attached to arm 15 such that head 16 can, as a unit, be moved upwardly and downwardly to vary the distance of head 16 and surface 52 above the ground and above surface 22. Alternatively, surface 52 can be connected to a component or mechanism which is carried in milling head 16 and which permits the position of horizontally oriented surface 52 to be moved up and down along an imaginary vertical axis while arm 15 and the remainder of head 16 remain fixed in position. Or, collar 50 can be adapted to be moved up and down cylindrical member 30 and to be fixedly secured to surface 31 of member 30 at various points therealong. Finally, table 17 can be designed to permit panel 20 and template 21 to be raised and lowered while maintaining planar surface 22 in a generally level orientation. For instance, support strip pairs 18, 19 of differing heights could be provided.

The elevation of lower surface 52 with respect to upper surface 22 of template 21 is preferably adjusted so that when milling head 16 is positioned over the area of surface 22 having the lowest elevation, a slight upward force F (FIG. 6) is generated on bearings 55 and arm 15 by the upper surface 22 of template 21. If an upward force is generated on bearings 55 by surface 22 when head 16 is positioned over the area of lowest elevation on surface 22, then surface 22 will always, regardless of the position of head 16 over surface 22, to some extent support the weight of milling head 16. Further, when head 16 is laterally displaced from the lowest elevation area of surface 22 to an area of higher elevation, the magnitude of upward force F will increase and cause the resilient flexure of arms 15, 12. When arms 12, 15 are in a state of upward resilient flexure, they force milling head 16 and bearings 55 against surface 22 in the direction of arrow G in FIG. 2. Consequently, when milling head 16 is positioned in relation to fixed surface 22 so that bearings 55 contact surface 22 at the lowest elevation point of surface 22, the resilient flexure of arms 12, 15 is utilized to insure that bearings 55 continue to contact surface 22 as milling head 16 is laterally displaced to a variety of points over planar surface 22 of template 21.

Once the area of lowest elevation of surface 22 has been determined and the vertical elevation of surface 52 and/or surface 22 adjusted so bearings 55 continually contact surface 22 when head 16 is laterally displaced to any position over surface 22, bit 40 is inserted in milling head 16 and the apparatus utilized to rout a groove of constant depth in panel 20. In the Norfield Model 3800 FL a mechanism is provided for adjusting the distance bit 40 extends downwardly beyond the bottom of cylindrical member 30. This adjustment mechanism permits the depth of the groove to be routed by bit 40 to be adjusted as desired. The path bit 40 would follow in routing a groove within aperture 25 of template 21 is represented in FIG. 7 by dashed line 70.

Having described my invention in such terms as to enable those skilled in the art to understand and practice it, and having identified the presently preferred embodiments thereof, I claim:

1. Apparatus for routing an elongate groove of generally constant depth in a panel of material, said panel including an upper planar surface, said apparatus including, in combination,
    (a) a table for supporting in a generally horizontally oriented position said panel of material and a template positioned on top of said panel of material, said template having
        (i) top and bottom surfaces each lying in a generally horizontally disposed imaginary plane, and
        (ii) at least one opening formed therethrough, said opening including a peripheral edge defining said opening;
    (b) a base;
    (c) a first generally horizontally oriented elongate substantially rigid support arm having a first end and a second end, said first end being pivotally connected to said base such that said support arm pivots in a generally horizontal plane;
    (d) a second generally horizontally oriented elongate substantially rigid support arm having a rear end pivotally attached to said second end of said first support arm such that said second support arm pivots in a generally horizontal plane and having a forward end carrying a milling head fixedly attached hereto for simultaneous movement with said second arm, said milling head being supported by said second arm at a first normal elevation and having a top portion and a bottom portion and including (i) a cylindrical member extending downwardly from said bottom portion of said milling head and having an upper end, a lower end and an outer surface circumscribing a generally vertical imaginary axis, said outer surface being forced against and tracking said peripheral edge of said template opening when said apparatus is utilized to rout a groove in said panel of material, (ii) a cylindrical router bit extending downwardly from said lower end of said cylindrical member, said bit having a longitudinal axis generally corresponding to and lying along said generally vertical imaginary axis, (iii) means for rotating said router bit, (iv) a fixed surface generally lying in an imaginary horizontal plane perpendicular to said imaginary vertical axis, said fixed surface circumscribing and extending outwardly from said upper end of said cylindrical member and being provided with template contacting means extending downwardly therefrom, said template contacting means including collar means having a lower planar surface circumscribing and extending outwardly from said cylindrical member, and antifriction means carried by said lower surface of said collar means for contacting and moving over said surface of said template, said antifriction means providing minimal frictional resistance when forced against and moved laterally across said top surface of said template when said apparatus is utilized to rout a groove in said upper planar surface of said panel of material, (v) handles which can be grasped and pulled and pushed to laterally displace said milling head and first and second elongate support members in an infinite number of directions to position said milling head over selected portions of said top surface of said template to rout said groove in said panel, a downward force applied to said milling head when said head is only supported above the ground by said second arm causing the downward displacement thereof from said first normal elevation and causing the downward resilient flexure of said second support arm, an upward force applied to said milling head when said head is only supported above the ground by said second arm causing the upward displacement thereof from said first normal elevation and causing the upward resilient flexure of said second support arm, said template being positioned on said table such that each of said selected portions of said top surface of said template (e) contact said antifriction means of said template contacting means during routing of said grooves, and (f) support said milling head in one of
  (i) said first normal elevation, and
  (ii) a second elevation higher than said first normal elevation, said second arm being upwardly resiliently flexed when said milling head is supported in said second elevation by said template.

2. The apparatus of claim 1 wherein said antifriction means comprises bearing means rotatably carried in said lower surface of said collar means.

3. The apparatus of claim 1 wherein said antifriction means comprises Teflon carried on said lower surface of said collar means.

* * * * *